United States Patent
Martinez

(10) Patent No.: US 8,616,610 B1
(45) Date of Patent: Dec. 31, 2013

(54) MOTORIZED AUTOMOBILE SUNSHADE VISOR (MOTO-AUTO VISOR) SUPER DELUXE, DELUXE, AND BASIC MODEL

(76) Inventor: Abel Martinez, Hialeah, FL (US)

( * ) Notice: Subject to any disclaimer, the term of this patent is extended or adjusted under 35 U.S.C. 154(b) by 0 days.

(21) Appl. No.: 13/494,714

(22) Filed: Jun. 12, 2012

(51) Int. Cl.
*B60J 3/00* (2006.01)

(52) U.S. Cl.
USPC .............. 296/97.7; 296/97.8; 160/370.21

(58) Field of Classification Search
USPC .......... 296/97.4, 97.7, 97.8, 97.9, 97.11; 160/370.21, DIG. 2, DIG. 3, 370.22, 160/370.23
See application file for complete search history.

(56) References Cited

U.S. PATENT DOCUMENTS

| | | | | |
|---|---|---|---|---|
| 4,736,980 | A * | 4/1988 | Eubanks | 160/370.22 |
| 5,165,462 | A * | 11/1992 | Kang | 160/370.21 |
| RE35,080 | E * | 11/1995 | Nenstiel | 160/370.21 |
| 5,694,998 | A * | 12/1997 | Chen | 160/370.21 |
| 6,318,788 | B1 * | 11/2001 | Jaurigue | 296/97.4 |
| 7,140,662 | B1 * | 11/2006 | Wilkinson et al. | 296/97.4 |
| 7,252,321 | B2 * | 8/2007 | Lee | 296/97.4 |
| 7,445,276 | B2 * | 11/2008 | Gonzalez Merino et al. | 296/214 |
| 2004/0040672 | A1 * | 3/2004 | Nagar | 160/98 |
| 2005/0236863 | A1 * | 10/2005 | Lee | 296/97.4 |
| 2007/0205636 | A1 * | 9/2007 | Gonzalez Merino et al. | 296/214 |
| 2008/0179024 | A1 * | 7/2008 | Fichter et al. | 160/370.22 |
| 2012/0007385 | A1 * | 1/2012 | Ramesh | 296/136.04 |

* cited by examiner

Primary Examiner — Lori Lyjak

(57) ABSTRACT

Moto-Auto Visor is an automobile windshield visor that is placed on the dashboard and stuck by 2 suction cups. Moto-Auto Visor helps protect the interior of the vehicle from the Sun's Ultraviolet rays and also keeps it cooler. Moto-Auto Visor is also beneficial to Handicapped Individuals that can't easily remove and install a Sunshade. Moto-Auto Visor opens and closes its shade with Rods connected to the center console, which move in a circular up and down motion. Moto-Auto Visor in its Center Console has a compartment that can store a monetary expressway device and other belongings. Moto-Auto Visor has 3 Variations called Super Deluxe, Deluxe, and Basic. The Super Deluxe can be made to operate by either of 3 ways. First, by on off switch powered by direct or alternating current, secondly by an auxiliary remote control device and third manual. the Deluxe can be made to operate by either of 2 ways, on off switch and manually. While the Basic on manually.

4 Claims, 9 Drawing Sheets

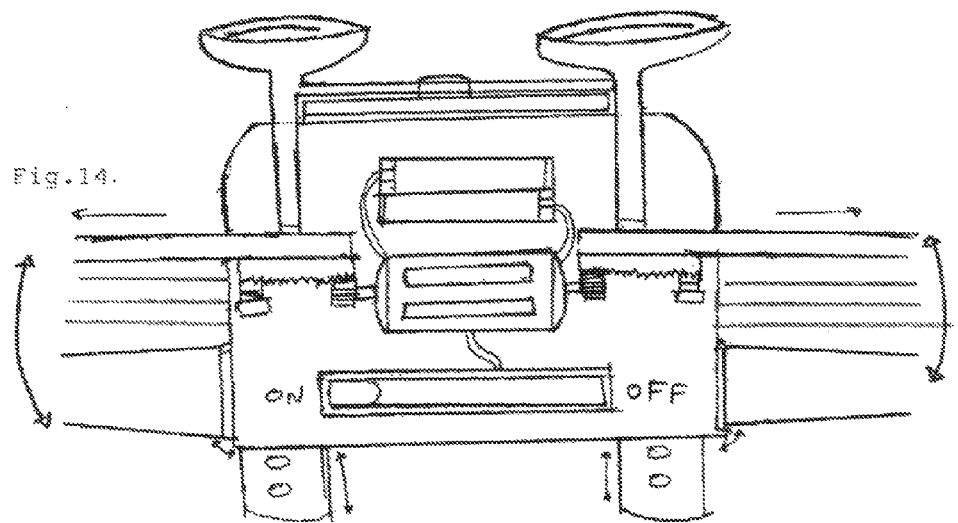
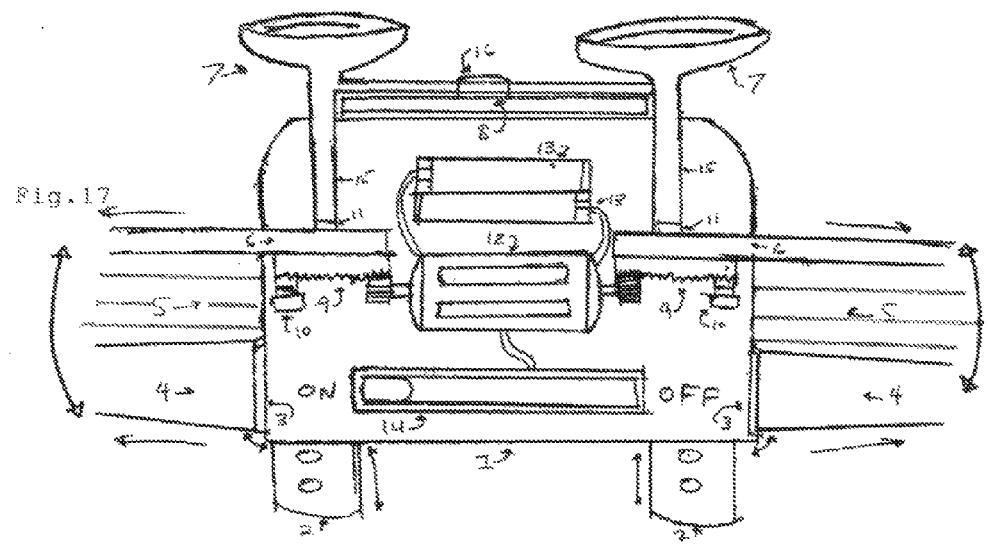

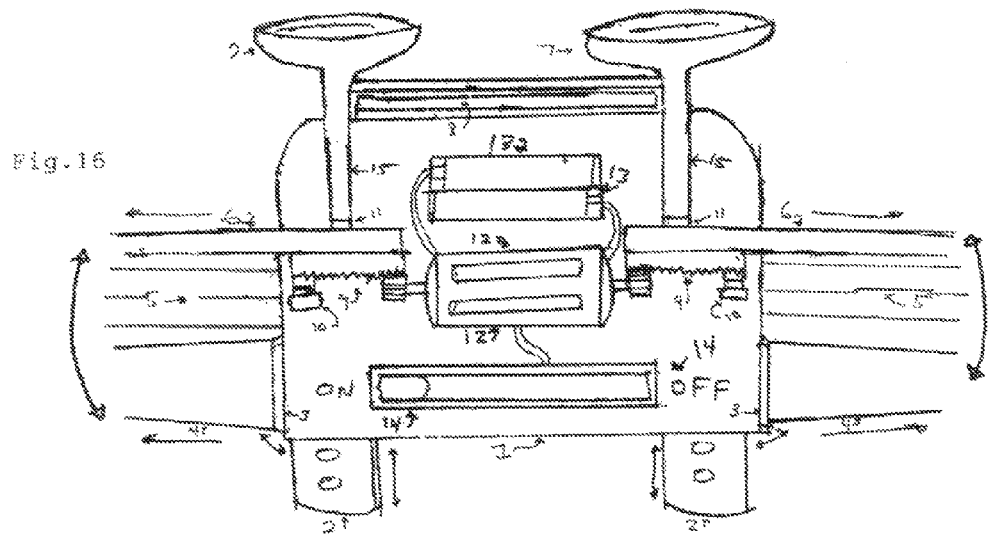
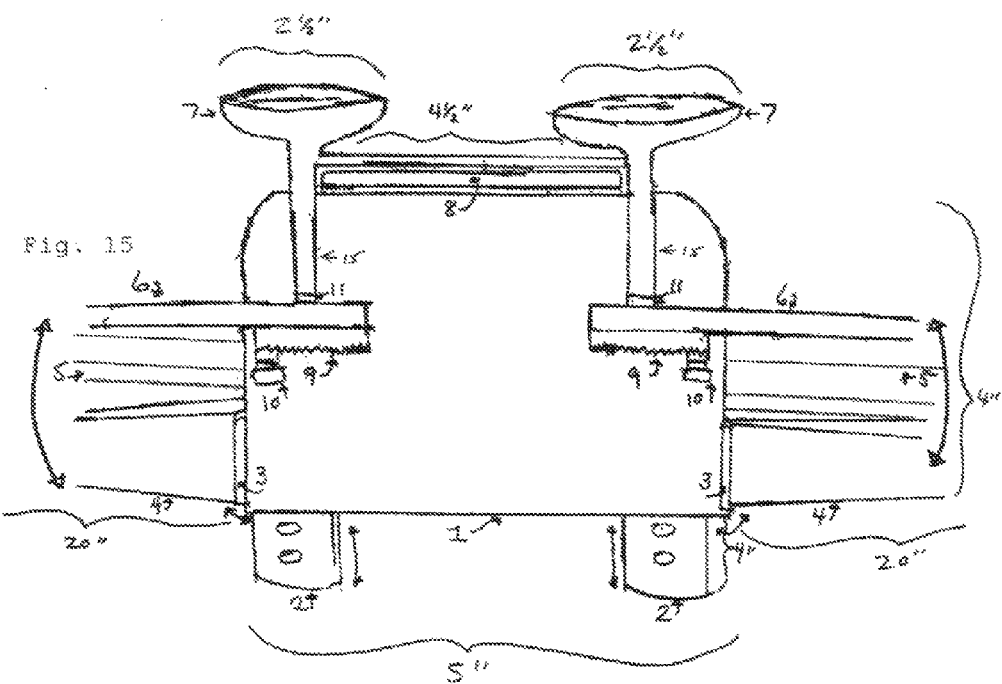

MOTORIZED AUTOMOBILE SUNSHADE VISOR (MOTO-AUTO VISOR) SUPER DELUXE, DELUXE, AND BASIC MODEL

BRIEFS DESCRIPTION OF THE FIGURE DRAWINGS

Figure 1:
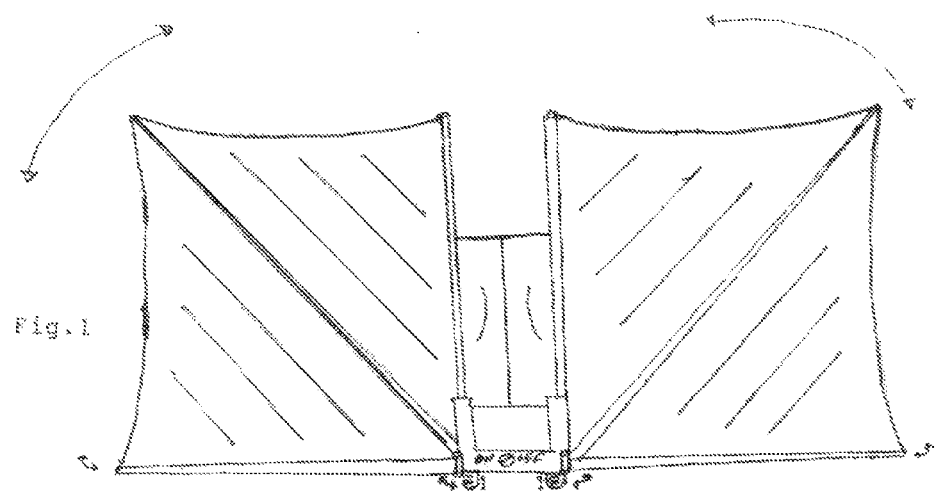

FIG. 1 Moto-Auto Visor Front view facing the interior of the vehicle in an open position blocking the Sun harmful rays from entering through the way of the dashboard, and keeping the vehicle cooler. This is where the Power On/Off switch is located in the center console.

Figure 2:
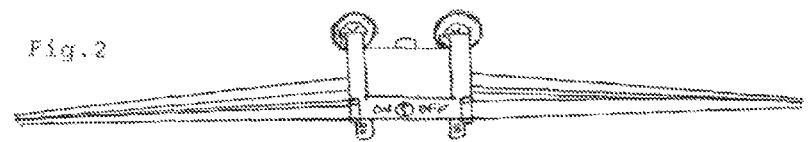

FIG. 2 Moto-Auto Visor in a closed position facing the interior vehicle as to the person's view from inside the vehicle. Same as FIG. 1 but in closed position.

Figure 3:
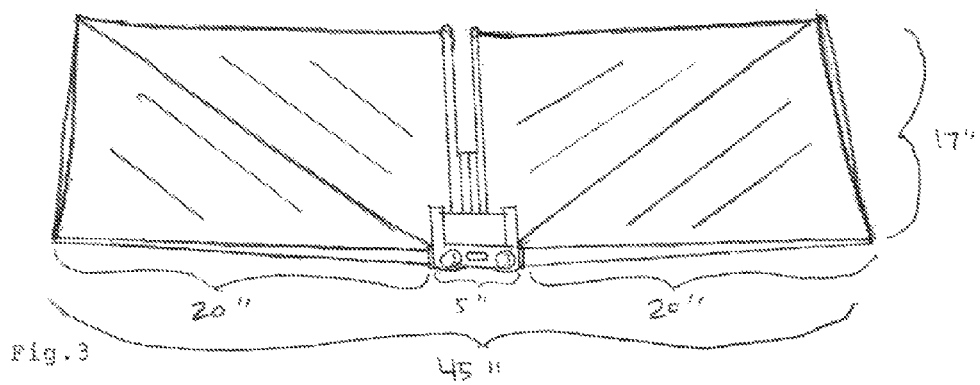

FIG. 3 Moto-Auto Visor in an opened position front view facing exterior of vehicle with measurements. This is the view someone standing outside the vehicle in the front of the vehicle would see.

Figure 4:
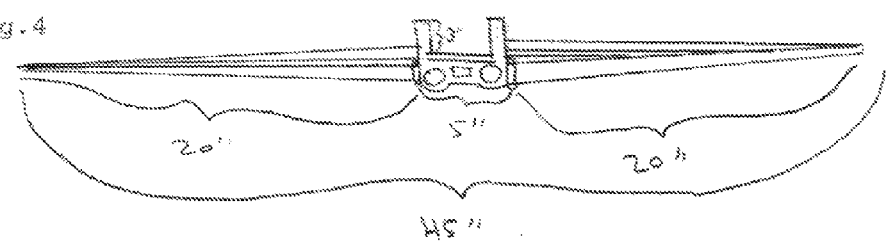

FIG. 4 Moto-Auto Visor in closed position front view with measurements facing exterior of vehicle. Same as FIG. 3, but in closed position.

Figure 5:
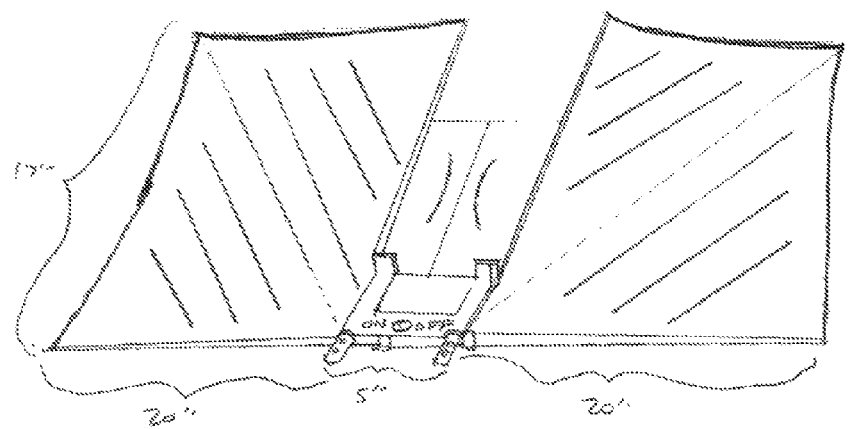

FIG. 5 Moto-Auto Visor in an opened position viewed from an angle, almost as if by the passenger of vehicle.

Figure 6:
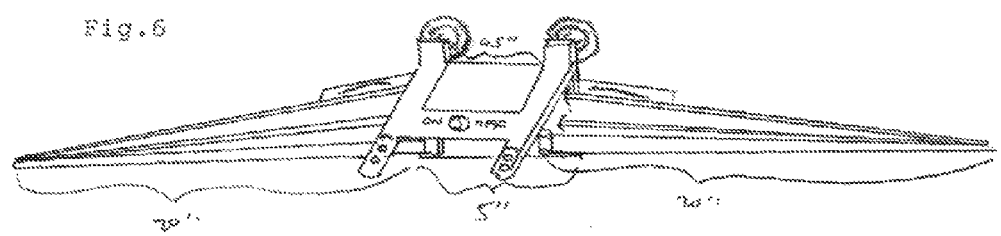

FIG. 6 Moto-Auto Visor in a closed position viewed from a lower right angle. Same as FIG. 5, but in closed position.

Figure 7:
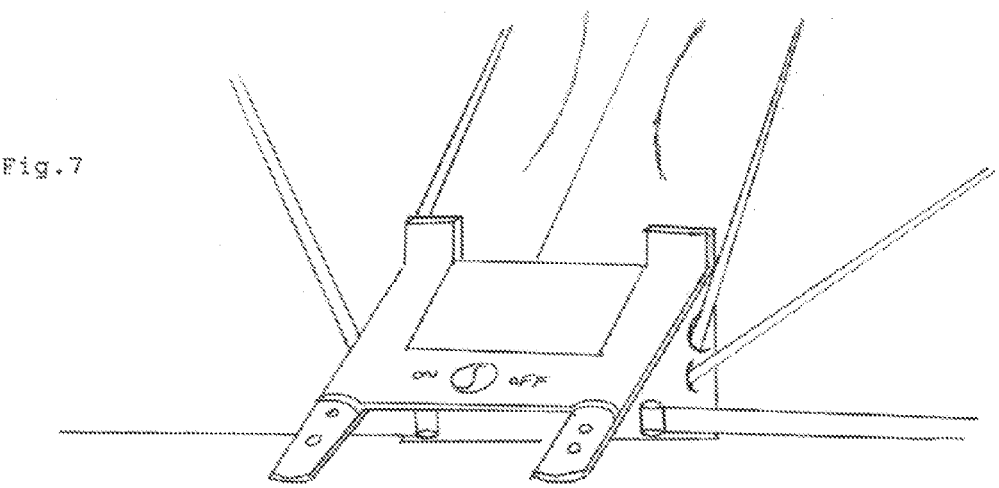

FIG. 7 Moto-Auto Visor in a close up view of the center console with measurements as it sits on the dashboard in an opened position blocking the Sun's harmful rays.

Figure 8:
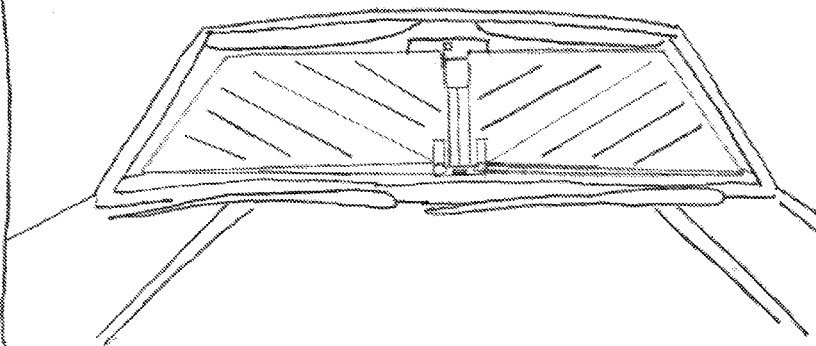

FIG. 8 Moto-Auto Visor in an opened position. Moto-Auto Visor as it will look when placed on the Dashboard of a vehicle.

Figure 9:
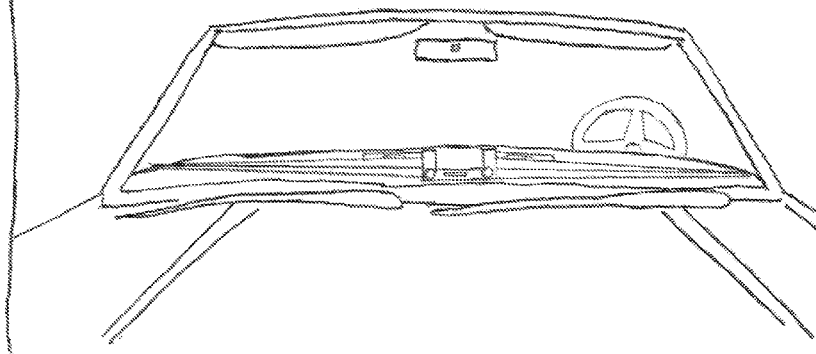

FIG. 9 Moto-Auto Visor on closed position. On dashboard facing the exterior of a vehicle. Same as FIG. 8, but closed.

Figure 10:
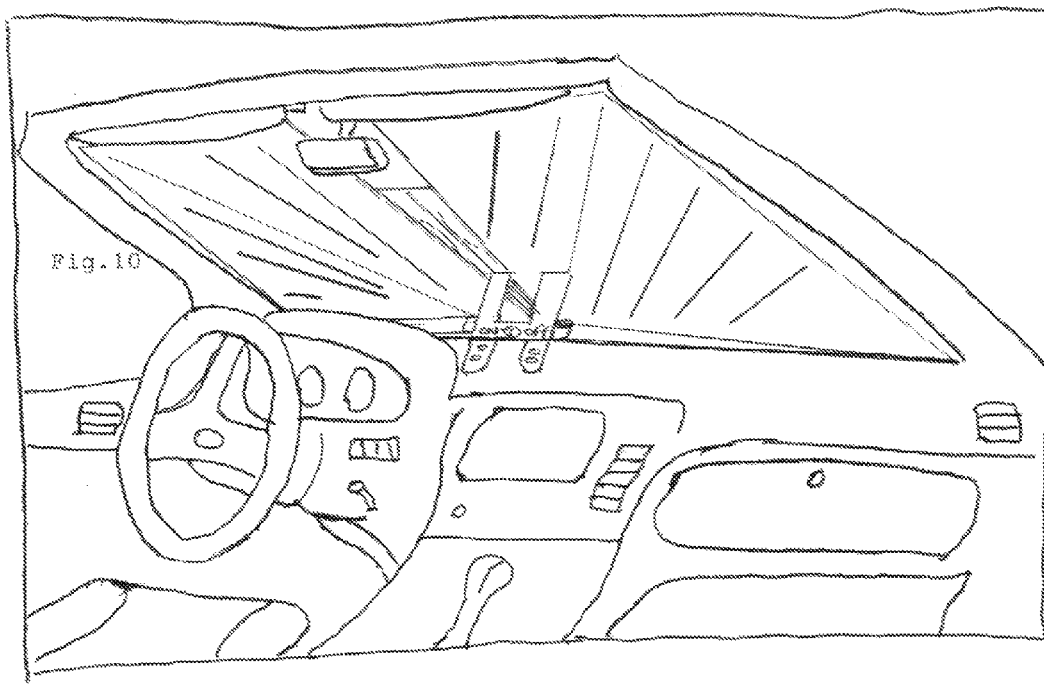

FIG. 10 Moto-Auto Visor on Dashboard open position angle interior view. As it will look like placed in vehicle.

Figure 11:
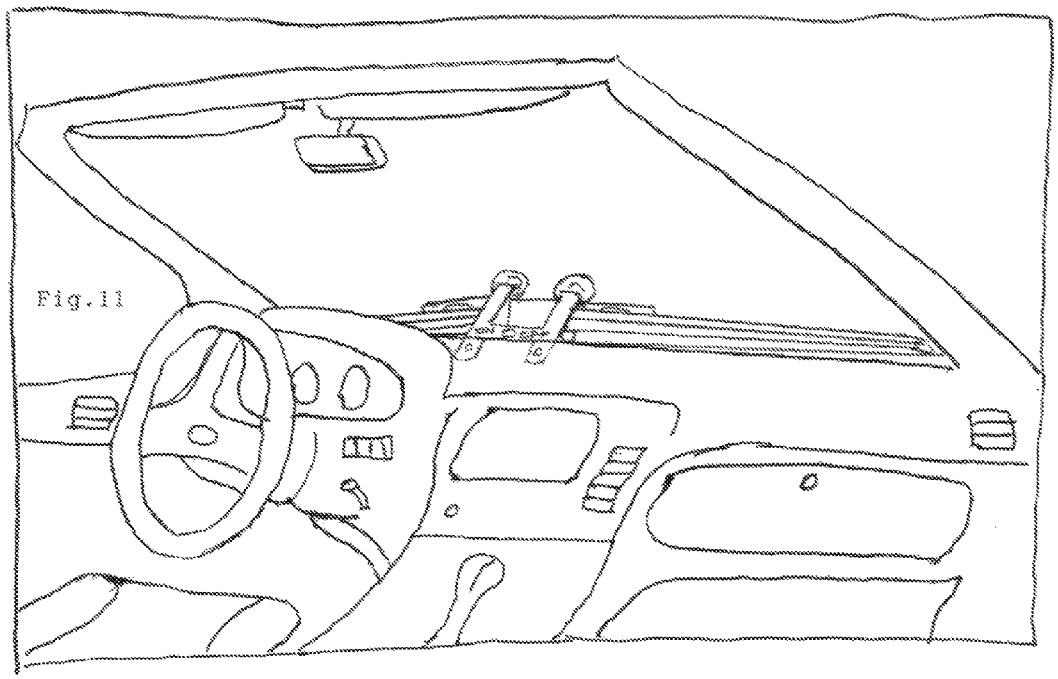

FIG. 11 Moto-Auto Visor in a closed position on the dashboard of vehicle interior view angled.

Figure 12:
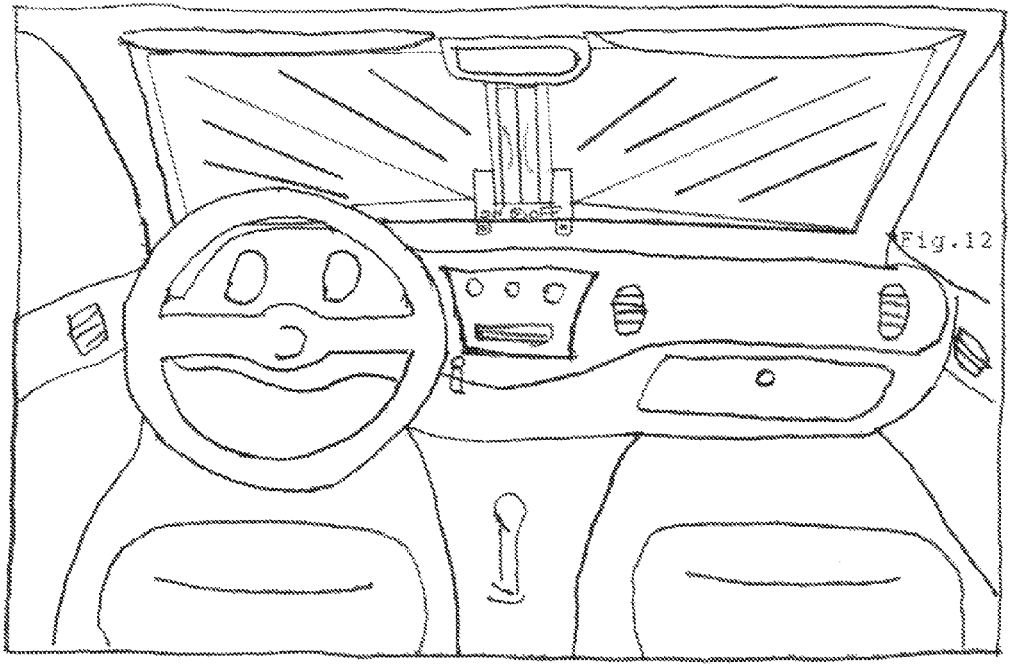

FIG. 12 Moto-Auto Visor in a opened position interior view on dashboard of vehicle.

Figure 13:
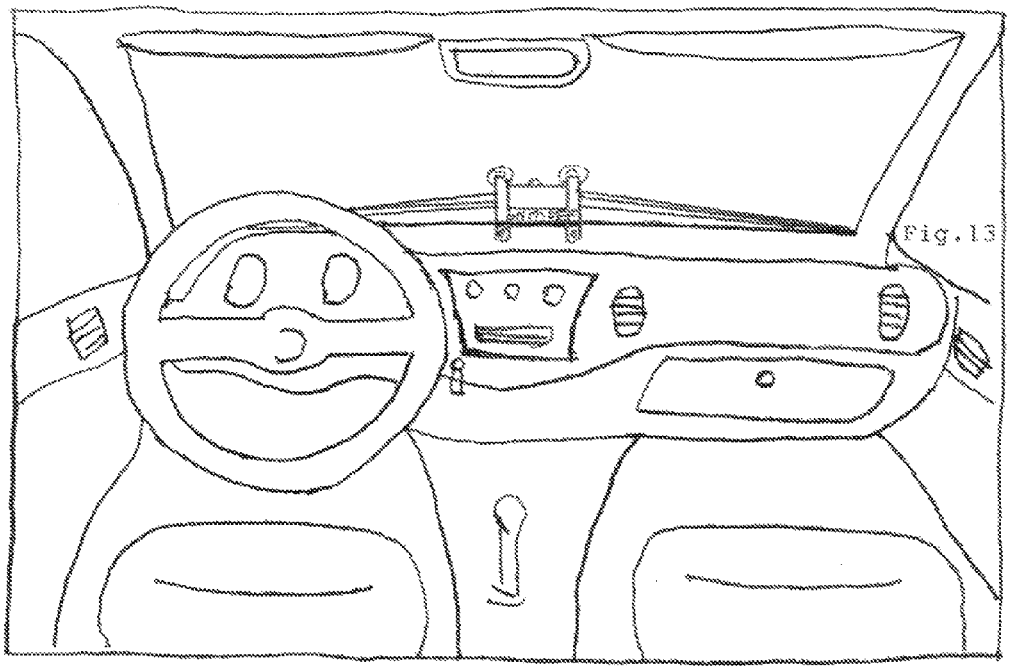

FIG. 13 Moto-Auto Visor in a closed position interior view on dashboard of vehicle.

FIG. 14 Moto-Auto Visor (Super Deluxe) interior components it's functionality. It is an aerial view as it is placed in the interior of the vehicle on the dashboard suctioned unto the windshield.

Explained further in the Detailed Description.

FIG. 15 Are the interior components in which of all Three Variations of the Moto-Auto Visors have in common. The SUPER DELUXE Model, the DELUXE Model and the BASIC Model with measurements.

Explained further in the Detailed Description.

FIG. 16 Are the interior components included only two of Moto-Auto Visor variations. And the are the SUPER DELXUXE and the DELUXE. With the combining components of FIG. 15.

Explained further in Detailed Description

FIG. 17 Is the Interior component of only one, and that is SUPER DELUXE Model. With the combination of the components of FIG. 16 and FIG. 15 that make up the SUPER DELUXE Model.

Explained further in Detailed Description.

For a better understanding of the invention Moto-Auto Visor SUPER DELUXE Model.

REFERENCE THE FOLLOWING DETAILED DESCRIPTION

Detailed Description of the Moto-Auto Visor SUPER DELUXE Model:

Referring now to FIG. 15

Here it is shown the functionality of the Motorized Automobile Windshield Visor or Moto-Auto Visor for short SUPER DELUXE Model. 1 is the Center Console Housing Unit (made of plastic) it holds all the parts that make Moto-Auto Visor operate. 2 is the Adjustable Leg Bracket Pulley (allows to fix to your specific dashboard). 3 Cylinders for positioning Lower Visor's Rod Arms 4 on the dashboard (allows to move the Lower Rod Arms forward or backwards). 4 Lower Visor Flaps Rod Arms (adjustable to move forward and back, but fixed in that it cannot move up or down. 5 Visor Flaps or Webbing (material that covers the windshield when operating Moto-Auto Visor protects the interior the vehicle from the Sun's harmful rays). 6 is the Upper Visor Arm Rod (opens and closes to expand the webbing) this rod moves up and down. 7 is Suctions Cups (that is placed to connect to the windshields interior side for placement of Moto-Auto Visor). 8 is the Expressways Monetary Device Compartment (or called Sun pass in the State of Florida) 9 is the Upper Visor Arms Flaps Wheel (attached to the Upper Visor Arm Rod 6 causes the area to open and close so to protect the interior of the vehicle from the Sun's rays). 10 is the Metal Clips (they are used in supporting of the Rotating Wheel 9 that hold Upper Visor Arm 6 in its place). 11 is Ball Bearings located within the Rotating Wheel 9.

Now referring to FIG. 16.

12 is the Double Sided Brush Motors (the power that retract and extends the Upper Visor Rods 6.). 13 is the double AA batteries used to power the Brushed Motors 12. 14 is the ON and OFF Switch used to extend and retract the Upper Visor Rod 6. 15 is chrome tube that connects Suctions Cups 7 to the Ball Bearing 11 to the Upper Rod Arms 6.

Now referring to FIG. 17.

16 the Remote Sensor that receives the input to extent and retract Upper Rod Arms 6.

Detailed Description of Variation of Moto-Auto Visor 2 DELUXE Model:

Referring now to FIG. 15.

Here it is shown the functionality of the Motorized Automobile Windshield Visor or Moto-Auto Visor for short the DELUXE Model. 1 is the Center Console Housing Unit (made of plastic) it holds all the parts that make Moto-Auto Visor operate. 2 is the Adjustable Leg Bracket Pulley (allows to fix to your specific dashboard). 3 Cylinders for positioning Lower Visor's Rod Arms 4 on the dashboard (allows moving forward or back the lower rod arms 4). 4 Lower Visor Flaps Rod Arms (adjustable to move forward and back, but fixed in that it cannot move up or down. 5 Visor Flaps or Webbing (material that covers the windshield when operating Moto-Auto Visor protects the interior the vehicle from the Sun's harmful rays). 6 is the Upper Visor Arm Rod (opens and closes to expand the webbing) this rod moves up and down. 7 is Suctions Cups (that is placed to connect to the windshields interior side for placement of Moto-Auto Visor). 8 is the Expressways Monetary Device Compartment (or called Sun pass in the State of Florida) 9 is the Upper Visor Arms Flaps Wheel (attached to the Upper Visor Arm Rod 6 causes the area to open and close—so to protect the interior of the vehicle from the Sun's rays). 10 is the Metal Clips (which are for holding in place the Rotating Wheel 9 that hold Upper Visor Arm 6 in its place). 11 Is Ball Bearings located within the Rotating Wheel 9.

Now referring to FIG. 16.

12 is the Double Sided Brush Motors (the power that retract and extends the Upper Visor Rods 6.). 13 is the double AA batteries used to power the Brushed Motors 12. 14 is the ON and OFF Switch used to extend and retract the Upper Visor Rod 6. 15 is chrome tube that connects Suctions Cups 7 to the Ball Bearing 11 to the Upper Rod Arms 6.

Detailed Description of Variation Moto-Auto Visor 3 BASIC Model:

Referring now to FIG. 15

Here it is shown the functionality of the Manual Automobile Windshield Visor or Moto-Auto Visor for short BASIC Model. 1 is the Center Console Housing Unit (made of plastic) it holds all the parts that make Moto-Auto Visor operate. 2 is the Adjustable Leg Bracket Pulley (Allows adjusting to your specific dashboard size). 3 Cylinders for positioning Lower Visor's Rod Arms 4 on the dashboard (allows to move the Lower Rod Arms 4 forward or backwards to adjust to your specific dashboard size). 4 Lower Visor Flaps Rod Arms (adjustable to move forward and back, but fixed in that it cannot move up or down. 5 Visor Flaps or Webbing (material that covers the windshield when operating Moto-Auto Visor protects the interior the vehicle from the Sun's harmful rays). 6 is the Upper Visor Arm Rod (opens and closes to expand the webbing) this rod moves up and down. 7 is Suctions Cups (that is placed to connect to the windshields interior side for placement of Moto-Auto Visor). 8 is the Expressways Monetary Device Compartment (or called Sun pass in the State of Florida) 9 is the Upper Visor Arms Flaps Wheel (attached to the Upper Visor Arm Rod 6 causes the area to open and close—so to protect the interior of the vehicle from the Sun's rays). 10 is the Metal Clips (for support of the Rotating Wheel 9 that hold Upper Visor Arm 6 in its place). 11 is Ball Bearings located within the Rotating Wheel 9.

I claim:

1. A motorized and remotely active sunshade assembly for a vehicle comprising:
    a center console mounted on the center of a dashboard with two suction cups attached to an interior surface of a windshield, the center console comprising a bottom;
    four rods extending from the bottom,
    wherein two of said four rods are rigid rods; and
    wherein another two of said four rods are rotary rods capable of up and down circulating motion to cover said windshield;
    a plurality of sunshade flaps extending between the rigid rods at the bottom and the rotary rods in a rotary angle, said plurality of sunshade flaps being extendable into an extended position to cover the windshield;
    said plurality of sunshade flaps being retractable into a retracted position, which uncovers the windshield;
    a control unit for selecting the extended position or the retracted position; and
    a remote access control sensor for the activating said sunshade flaps into the extended position and the retracted position.

2. The motorized and remotely activated sunshade assembly of claim 1, further comprising an ignition sensor adapter for sensing when the vehicle is running, said ignition sensor adapter being coupled to said control unit for preventing activation of the sunshade flaps into the extended position while the vehicle is running.

3. The motorized and remotely activated sunshade assembly of claim 1, further comprising:
    a motor operationally coupled to said control unit;
    two star wheel arm brackets extending from said motor, said motor enabling selectively turning each of the two star wheeled arm brackets;
    a ball bearing coupled to each of the star wheeled arm brackets to rotate the rotary rods so that the sunshade flaps are alternatively in the extended position and the retracted position; and
    a pair of star wheel brackets, each affixed alongside one of the star wheel arm brackets.

4. The motorized and remotely activated sunshade assembly of claim 1, comprising:
    a control unit switch operational to activate the sunshade flaps between the extended position or the retracted position;
    a remote control operable to remotely activate the sunshade flaps between the extended position or the retracted position;
    an auxiliary battery source coupled to said control unit for providing power to said control unit when the vehicle in not running;
    a direct power source able to connect to the vehicle;
    an adhesive usable on the center console;
    a compartment within the center console for Holding pay toll transponders; and
    wherein the sunshade flaps comprise a mesh type material that is collapsible, said mesh type material collapsible into itself when the sunshade flaps are in the retracted position and able to elongate when the sunshade flaps are in the extended position.

* * * * *